US009280529B2

(12) United States Patent
Lemonik et al.

(10) Patent No.: US 9,280,529 B2
(45) Date of Patent: Mar. 8, 2016

(54) COLLABORATIVE CURSORS IN A HOSTED WORD PROCESSOR

(75) Inventors: Micah Lemonik, New York, NY (US); Olga S. Belomestnykh, New York, NY (US); Janani R. Ravi, Jersey City, NJ (US); Luiz A. F. Pereira Filho, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/350,106

(22) Filed: Jan. 13, 2012

(65) Prior Publication Data
US 2012/0110443 A1    May 3, 2012

Related U.S. Application Data

(63) Continuation of application No. 13/085,292, filed on Apr. 12, 2011.

(60) Provisional application No. 61/323,259, filed on Apr. 12, 2010.

(51) Int. Cl.
*G06F 17/20* (2006.01)
*G06F 17/24* (2006.01)
*G06F 17/22* (2006.01)

(52) U.S. Cl.
CPC .......... *G06F 17/241* (2013.01); *G06F 17/2288* (2013.01)

(58) Field of Classification Search
CPC ....................................................... G06F 17/20
USPC ......................................................... 715/255
See application file for complete search history.

(56) References Cited

U.S. PATENT DOCUMENTS

| 5,528,743 | A  | 6/1996  | Tou et al.     |
|-----------|----|---------|----------------|
| 5,758,358 | A  | 5/1998  | Ebbo           |
| 5,761,669 | A  | 6/1998  | Montague et al.|
| 5,793,966 | A  | 8/1998  | Amstein et al. |
| 5,895,476 | A  | 4/1999  | Orr et al.     |
| 5,930,813 | A  | 7/1999  | Padgett et al. |
| 6,006,239 | A  | 12/1999 | Bhansali et al.|
| 6,049,239 | A  | 4/2000  | Eto et al.     |
| 6,169,999 | B1 | 1/2001  | Kanno          |
| 6,243,706 | B1 | 6/2001  | Moreau et al.  |
| 6,327,584 | B1 | 12/2001 | Xian et al.    |

(Continued)

OTHER PUBLICATIONS

Cayenne-McCall, Lawrence. "Synchronous 3D Document Collaboration" Pace University, Department of Computer Science, 42 pages (Nov. 2008).

(Continued)

*Primary Examiner* — Peiyong Weng
(74) *Attorney, Agent, or Firm* — Ropes & Gray LLP

(57) ABSTRACT

A computer-implemented collaborative editing method includes receiving input from a user of a browser-based document editing application on a document displayed by the application; identifying a current location in the document for a cursor of a first user executing the application; receiving from a central server system data that reflects changes made to the document by one or more users other than the first user and current positions in the document of cursors for the one or more other user; updating a document model stored on a computing device that is executing the browser-based application and rendering at least a portion of the model to the browser; and rendering the current positions of the cursors for the one or more other users to the browser.

24 Claims, 8 Drawing Sheets

(56) References Cited

U.S. PATENT DOCUMENTS

| | | | |
|---|---|---|---|
| 6,330,046 B1 | 12/2001 | Ishitaka et al. | |
| 6,341,305 B2 | 1/2002 | Wolfe | |
| 6,377,354 B1 | 4/2002 | Nguyen et al. | |
| 6,418,441 B1 | 7/2002 | Call | |
| 6,501,779 B1 | 12/2002 | McLaughlin et al. | |
| 6,512,531 B1 | 1/2003 | Gartland | |
| 6,662,210 B1* | 12/2003 | Carleton et al. | 709/204 |
| 6,705,584 B2 | 3/2004 | Hiroshima et al. | |
| 6,717,593 B1 | 4/2004 | Jennings | |
| 6,737,289 B2 | 5/2004 | Woo et al. | |
| 6,879,997 B1 | 4/2005 | Ketola et al. | |
| 6,967,704 B2 | 11/2005 | Hoshino | |
| 6,972,748 B1 | 12/2005 | Lang | |
| 6,983,316 B1 | 1/2006 | Milne et al. | |
| 7,009,626 B2 | 3/2006 | Anwar | |
| 7,026,100 B2 | 4/2006 | Nakata et al. | |
| 7,031,954 B1 | 4/2006 | Kirsch | |
| 7,035,910 B1 | 4/2006 | Dutta et al. | |
| 7,039,643 B2 | 5/2006 | Sena et al. | |
| 7,231,597 B1 | 6/2007 | Braun et al. | |
| 7,287,094 B2 | 10/2007 | Mogul | |
| 7,437,421 B2 | 10/2008 | Bhogal et al. | |
| 7,478,330 B1 | 1/2009 | Branson et al. | |
| 7,487,448 B2 | 2/2009 | Emerson et al. | |
| 7,491,399 B2 | 2/2009 | Vakharia | |
| 7,529,778 B1 | 5/2009 | Dewey et al. | |
| 7,624,145 B2 | 11/2009 | Junuzovic et al. | |
| 7,656,543 B2 | 2/2010 | Atkins | |
| 7,680,932 B2 | 3/2010 | Defaix et al. | |
| 7,698,379 B2 | 4/2010 | Dutta et al. | |
| 7,712,016 B2 | 5/2010 | Jones et al. | |
| 7,774,703 B2 | 8/2010 | Junuzovic et al. | |
| 7,792,788 B2 | 9/2010 | Melmon et al. | |
| 7,836,148 B2 | 11/2010 | Popp et al. | |
| 7,890,928 B2 | 2/2011 | Patrudu | |
| 7,920,240 B2 | 4/2011 | Yonemura | |
| 7,920,894 B2 | 4/2011 | Wyler | |
| 7,953,696 B2 | 5/2011 | Davis et al. | |
| 7,958,448 B2 | 6/2011 | Fattic, II et al. | |
| 7,983,416 B2 | 7/2011 | Takashima et al. | |
| 8,019,780 B1 | 9/2011 | Pinkerton et al. | |
| 8,044,961 B2 | 10/2011 | Opstad et al. | |
| 8,065,604 B2 | 11/2011 | Blankinship | |
| 8,073,812 B2 | 12/2011 | Curtis et al. | |
| 8,327,127 B2 | 12/2012 | Suryanarayana et al. | |
| 8,327,812 B2 | 12/2012 | Vuk | |
| 8,395,733 B2 | 3/2013 | Ataka et al. | |
| 2001/0033917 A1 | 10/2001 | Hosino | |
| 2002/0032701 A1 | 3/2002 | Gao et al. | |
| 2002/0035580 A1 | 3/2002 | Tanabe | |
| 2002/0133492 A1 | 9/2002 | Goldstein et al. | |
| 2002/0174085 A1 | 11/2002 | Nelson et al. | |
| 2003/0037076 A1 | 2/2003 | Bravery et al. | |
| 2003/0037303 A1 | 2/2003 | Bodlaender et al. | |
| 2003/0084078 A1 | 5/2003 | Torii et al. | |
| 2003/0115268 A1 | 6/2003 | Esposito | |
| 2003/0179230 A1 | 9/2003 | Seidman | |
| 2004/0015781 A1 | 1/2004 | Brown et al. | |
| 2004/0044965 A1 | 3/2004 | Toyama et al. | |
| 2004/0085354 A1 | 5/2004 | Massand | |
| 2004/0088374 A1 | 5/2004 | Webb et al. | |
| 2004/0088653 A1 | 5/2004 | Bell et al. | |
| 2004/0133444 A1 | 7/2004 | Defaix et al. | |
| 2004/0133639 A1* | 7/2004 | Shuang et al. | 709/204 |
| 2004/0215672 A1 | 10/2004 | Pfitzner | |
| 2004/0215825 A1 | 10/2004 | Pfitzner | |
| 2004/0215826 A1 | 10/2004 | Pfitzner | |
| 2004/0216090 A1 | 10/2004 | Kaler et al. | |
| 2005/0091291 A1 | 4/2005 | Kaler et al. | |
| 2005/0125461 A1 | 6/2005 | Filz | |
| 2005/0131887 A1 | 6/2005 | Rohrabaugh et al. | |
| 2005/0185636 A1 | 8/2005 | Bucher | |
| 2005/0200896 A1 | 9/2005 | Narusawa et al. | |
| 2005/0234943 A1 | 10/2005 | Clarke | |
| 2006/0031751 A1 | 2/2006 | Ehud | |
| 2006/0075332 A1 | 4/2006 | Fairweather et al. | |
| 2006/0080601 A1* | 4/2006 | Weber et al. | 715/513 |
| 2006/0101071 A1 | 5/2006 | Henderson | |
| 2006/0149795 A1 | 7/2006 | Gillespie et al. | |
| 2006/0200755 A1* | 9/2006 | Melmon et al. | 715/511 |
| 2006/0230344 A1 | 10/2006 | Jennings et al. | |
| 2006/0248121 A1 | 11/2006 | Cacenco et al. | |
| 2007/0033654 A1 | 2/2007 | Wilson | |
| 2007/0061714 A1 | 3/2007 | Stuple et al. | |
| 2007/0070066 A1 | 3/2007 | Bakhash | |
| 2007/0073899 A1 | 3/2007 | Judge et al. | |
| 2007/0094601 A1 | 4/2007 | Greenberg et al. | |
| 2007/0186157 A1 | 8/2007 | Walker et al. | |
| 2007/0208992 A1 | 9/2007 | Koren | |
| 2007/0220068 A1 | 9/2007 | Thompson et al. | |
| 2007/0233811 A1 | 10/2007 | Rochelle et al. | |
| 2007/0239695 A1 | 10/2007 | Chakra et al. | |
| 2007/0239828 A1* | 10/2007 | Patton et al. | 709/204 |
| 2007/0279572 A1 | 12/2007 | Yonemura | |
| 2007/0282914 A1 | 12/2007 | Sivapragasam et al. | |
| 2007/0288637 A1 | 12/2007 | Layton et al. | |
| 2007/0299857 A1 | 12/2007 | Gwozdz et al. | |
| 2008/0028302 A1 | 1/2008 | Meschkat | |
| 2008/0040659 A1 | 2/2008 | Doyle | |
| 2008/0059539 A1 | 3/2008 | Chin et al. | |
| 2008/0082604 A1 | 4/2008 | Mansour et al. | |
| 2008/0126943 A1 | 5/2008 | Parasnis et al. | |
| 2009/0112990 A1 | 4/2009 | Campbell et al. | |
| 2009/0192845 A1 | 7/2009 | Gudipaty et al. | |
| 2009/0235181 A1 | 9/2009 | Saliba et al. | |
| 2009/0328063 A1 | 12/2009 | Corvera et al. | |
| 2010/0030578 A1 | 2/2010 | Siddique et al. | |
| 2010/0083096 A1 | 4/2010 | Dupuis-Latour et al. | |
| 2010/0153948 A1 | 6/2010 | Schreiber et al. | |
| 2010/0199191 A1 | 8/2010 | Takahashi | |
| 2010/0218099 A1 | 8/2010 | van Melle et al. | |
| 2010/0235763 A1 | 9/2010 | Massand | |
| 2010/0241749 A1 | 9/2010 | Rasmussen et al. | |
| 2010/0245256 A1 | 9/2010 | Estrada et al. | |
| 2010/0251122 A1 | 9/2010 | Lee et al. | |
| 2011/0018963 A1 | 1/2011 | Robinson | |
| 2011/0066957 A1 | 3/2011 | Prats et al. | |
| 2011/0085211 A1 | 4/2011 | King et al. | |
| 2011/0154185 A1 | 6/2011 | Kern et al. | |
| 2011/0178981 A1 | 7/2011 | Bowen et al. | |
| 2011/0302237 A1 | 12/2011 | Knight et al. | |
| 2012/0072819 A1 | 3/2012 | Lindner et al. | |
| 2012/0110445 A1 | 5/2012 | Greenspan et al. | |
| 2012/0331373 A1 | 12/2012 | Lindner et al. | |
| 2014/0040202 A1 | 2/2014 | Hagan et al. | |

OTHER PUBLICATIONS

International Search Report & Written Opinion for Application No. PCT/US2011/032138, 13 pages (dated Jul. 12, 2011).

De Lara, Eyal, Dan S. Wallach, and Willy Zwaenepoel, "Puppeteer: Component-based Adaptation for Mobile Computing," Proceedings of the 3rd USENIX Symposium on Internet Technologies and Systems, 14 pages (Mar. 27, 2001).

Fraser, Neil, "Differential Synchronization," Google, Munich, Germany, 8 pages (2009).

Gutwin, Carl, Ghristopher Fedak, Mark Watson, Jeff Dyck, and Tim Bell, "Improving Network Efficiency in Real-Time Groupware with General Message Compression," University of Saskatchewan, Canada, University of Canterbury, 10 pages, New Zealand (2006).

Muhammad, Yasir, Shahida Jabeen, Aslam Muhammad, and Martinez Enriquez A.M., "Awareness Elements In Web Based Cooperative Writing Applications," Second Asia-Pacific Conference on Computational Intelligence and Industrial Applications, 18 pages (2009).

Shen Haifeng and Chengzheng Sun. "Flexible Notification for Collaborative Systems" School of Computing and Information Technology, Griffith University, Australia, 10 pages (2002).

Zafer, Ali Asghar, "NetEdit: A Collaborative Editor," Blacksburt, Virginia, 89 pages (Apr. 23, 2011).

Burigat et al., "Visualizing locations of off-screen objects on mobile devices," Proceedings of the 8th Conference on Human-Computer

(56) References Cited

OTHER PUBLICATIONS

Interaction with Mobile Devices and Services, MOBILEHCI '06, Sep. 12, 2006, p. 239, XP055107181, DOI: 10.1145/1152215.1152266, ISBN: 978-1-59-593390-4.
Ferreira et al., "Evaluating Shared Workspace Performance Using Human Information Processing Models", Information Research,14(1):1-21 (2009).
European Office Action dated Apr. 3, 2014.
"File:" Microsoft Computer Dictionary; May 1, 2002; Microsoft Press; Fifth Edition, p. 266.
"Simultaneously Edit a Presentation With Other Authors," by MicrosoftTM Office: MAC, published Nov. 11, 2010, pp. 1-4.
Beresford et al., "MockDroid: Trading Privacy for Application Functionality on Smartphones," HotMobile '11 Mar. 1-3, 2011, Phoenix, AZ, USA, pp. 49-54.
Chevalier et al., Using Text Animated Transitions to Support Navigation in Document Histories, Proceedings of the 28th International Conference in Human Factors in Computing Systems, Apr. 10, 2010, pp. 683-692.
Danilatos, "Demonstration Doodad, with a few different variations of rendering and interactive behavior," Dec. 5, 2010, pp. 1-3, retrieved from the Internet May 24, 2012: http://code.google.com/p/waveprotocol/source/browse/srcJorg/waveprotocol/wave/client/editor/exampleslimg/MyDoodad.java.
Ellis et al., "Concurrency Control in Groupware Systems," ACM 1989, pp. 399-407.
Ellis et al., Groupware Some Issues and Experiences, Communications of the Association for Computing Machinery, ACM, 34:1, Jan. 1, 1991, pp. 38-58.
Herrick, "Google This! Using Google Apps for Collaboration and Productivity," Proceedings of the ACM SIGUCCS Fall Conference on User Services Conference, SIGUCCS '09, Jan. 1, 2009, p. 55.
http://web.archive.org/web/20120512130530/https://developer.mozilla.org/en/Setting_up_extension_development_environment, 7 pages (undated).
http://web.archive.org/web/20120819143535/https://addons.mozilla.org/en -US/firefox/extensions/?sort=featured, retrieved from internet Dec. 13, 2013, 3 pages.
http://web.archive.org/web/20121020134710/https://addons.mozilla.org/en -US/seamonkey/extensions, retrieved from internet Dec. 13, 2013, 3 pages.
http://web.archive.org/web/20121021135356/http://support.mozilla.org/en -US/kb/find-and-install-add-ons-add-features-to-firefox, retrieved from internet Dec. 13, 2013, 3 pages.
http://www-archive.mozilla.org/projects/webservices, Snapshot taken on 4,21,2008, 4 pages.
Jason Hill & Carl Gutwin, The MAUI Toolkit: Groupware Widgets for Group Awareness, pp. 539-571 in Computer Supported Cooperative Word (2004) 13 (copyright 2005) ("MAUI").
Junuzovic et al., Read, Write and Navigation Awareness in Realistic Multi-View Collaborations, International Conference on Collaborative Computing: Networking, Applications and Worksharing, 2007, pp. 494-503.
Krieger, "Documents, Presentations, and Workbooks: Using Microsoft® Office to Create Content That Gets Noticed," published May 2011, pp. 1-104.
Ignat et al., "Awareness of Concurrent Changes in Distributed Software Development, On the Move to Meaningful Internet Systems," TM 2008, Nov. 9, 2008, pp. 456-464.
Masoodian, M., et al., "RECOLED: A Group-Aware Collaborative Text Editor for Capturing Document History," In Proceedings of IADIS International Conference on WWW/Internet, Lisbon, Portugal, Oct. 19-22, 2005, International Association for Development of the Information Society, vol. 1, pp. 323-330.
Munteaunu et al., "Collaborative Editing for Improved Usefulness and Usability of Transcript-Enhanced Webcasts," ACM 2008, pp. 373-382.
Nauman et al., "Apex: Extending Android Permission Model and Enforcement with User-Defined Runtime Constraints," ASIACCS '10 Apr. 13-16, 2010 Beijing, China, pp. 326-332.

Pacull et al., "Duplex: A Distributed Collaborative Editing Environment in Large Scale," ACM 1994, pp. 165-173.
Taylor, "Cool Apple Keynote Presentation Tricks and Tips," published Apr. 2011, pp. 1-5.
The Oauth 2.0 Authorization Protocol; draft letf-oauth-v2-24; Mar. 8, 2012.
Using Adobe Flash Professional CS5 & C55.5, Jan. 16, 2012, Adobe Systems Incorporated, pp. 125-126, http://help.adobe.com/en_US/flash/cs/using/fash_cs5_help.pdf.
Wempen, Faithe, "PowerPoint 2010 Bible," May 24, 2010, John Wiley & Sons, pp. 491-519.
Zhou et al., "Taming Information-Stealing Smartphone Applications (on Android)," LNCS 6740:93-107 (2011).
Shen et al., "Flexible Merging for Asynchronous Collaborative Systems," from on the Move to Meaningful Internet Systems 2002: CoopIS, DOA, and ODBASE, 2002, Springer-Verlag Berlin Heidelberg, XP55000894, ISBN: 978-3-54-000106-5, pp. 304-321.
"Use a Shared Workbook to Collaborate," https://support.office.com/en-ca/article/Use-a-shared-workbook-to-collaborate-b8207fe9-a613-483f-b804-0ca4658b0c61?CorrelationId=f94b6a6f-429e-40f1-a2c5-4d67e8513591&ui=en-US&rs=en-CA&ad=CA, Nov. 9, 2006, 8 pages.
Bibi et al., "A Platform for Delivering Multimedia Presentations on Cultural Heritage," 2010 14th Panhellenic Conference on Informatics, pp. 175-179.
Cairns et al., "System and Method of Document Embedding in Collaborative Editors," unpublished U.S. Appl. No. 13/493,672, filed Jun. 11, 2012, 1-48.
Cairns, "System and Method of Secure Communication Between Multiple Child Frames," unpublished U.S. Appl. No. 13/493,798, filed Jun. 11, 2012, 1-47.
Citro, "Conflict Management for Real-Time Collaborative Editing in Mobile Replicated Architectures," 2007, Australian Computer Society, Inc., Thirteenth Austrailian Computer Science Conference (ACSC2007), pp. 115-124.
Conner, Zoho 4 Everyone, 2008, downloaded from the internet http://techbus.safaribooksonline.com/print?xmlid=9780768687835/ch011ev1 sec1 , Aug. 21, 2012, p. 1-17.
Day-Richter et al., "System and Method for Managing Remote Procedure Calls Relating to a Third Party Software Application," unpublished U.S. Appl. No. 13/591,851, filed Aug. 22, 2012, pp. 1-98.
Day-Richter et al., "System and Method for Performing Data Management in a Collaborative Development Environment," unpublished U.S. Appl. No. 13/591,734, filed Aug. 22, 2012, pp. 1-101.
DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www .computerworld.com/s/article/pri nt/91 08 799/0n line_office_apps get_real_ Google D ocs vs ThinkFree vs. Zoho> (7 pages).
Grieve et al., "Systems and Methods for Collaborative Document Editing," unpublished U.S. Appl. No. 13/297,762, filed Nov. 16, 2011, pp. 1-49.
Gutwin et al., "The Effects of Workspace Awareness Support on the Usability of Real-Time Distributed Groupware," ACM Transactions on Computer-Human Interaction, vol. 6, No. 3, Sep. 1999, pp. 243-281.
Hodel et al., "Supporting Collaborative Layouting in Word Processing," University of Zurich, Department of Informatics; Zurich, Switzerland, 2004 (18 pages).
How to track and manage changes in a Word 2002 and a Word 2003 document, Microsoft Support, at least Mar. 5, 2008, available at http://support.microsoft.com/kb/305216 (3 pages).
Huang et al., "A General Purpose Virtual Collaboration Room," Google 1999, pp. 1-9.
Ignat et al., "CoDoc: Multi-mode Collaboration over Documents," ETII Surich, Institute for Information Systems; Zurich, Switzerland, 2004 (15 pages).
International Search Report & Written Opinion for Application No. PCT/US2011/032162 , dated Jul. 6, 2011, 13 pages.
Kjaer, "Timing and Synchronization in JavaScript", Dev. Opera, Sections: "The Basics", "Event Queing", "Long Running Scripts"

(56) References Cited

OTHER PUBLICATIONS and "Advice on Timing", Feb. 27, 2007, downloaded from URL: http/dev.opera.com/articles/view/timing-and-synchronization-injavascript/, pp. 1-9.

Lemonik et al., "System and Method for Providing Data Management Services," unpublished U.S. Appl. No. 13/224,860, filed Sep. 2, 2011, pp. 1-88.

Lemonik et al., "System and Method for Using a Third-Party Add-On in a Collaborative Online Software Development Environment," unpublished U.S. Appl. No. 13/551,859, filed Jul. 18, 2012, 1-103.

Lemonik et al., "System and Method for Providing Access to a Document Associated with a Third Party Software Application Via Interframe Communication," unpublished U.S. Appl. No. 13/224,769, filed Sep. 2, 2011, pp. 1-90.

Lemonik et al., "System and Method for Providing Real-Time Collaborative Document Editing Services," unpublished U.S. Appl. No. 13/224,573, filed Sep. 2, 2011, pp. 1-90.

Lemonik et al., "System and Method for Updating an Object Instance Based on Instructions Received from Multiple Devices," unpublished U.S. Appl. No. 13/282,636, filed Oct. 17, 2011, pp. 1-91.

Lemonik et al., "System and Method for Updating an Object Instance Based on Instructions Received from Multiple Devices," unpublished U.S. Appl. No. 13/224,479, filed Sep. 2, 2011, pp. 1-91.

Lemonik et al., "System and Method for Using a Third-System and Method for Using a Third-Party Add-On to Manipulate a Document in a Collaborative Online Software Development Environment," unpublished U.S. Appl. No. 13/551,772, filed Jul. 18, 2012, 1-119.

Lemonik et al., "System and Method to Provide Collaborative Document Processing Services Via Interframe Communication," unpublished U.S. Appl. No. 13/224,663, filed Sep. 2, 2011, pp. 1-90.

Nasir et al., "Collaborative Report Creation System for Industrial use," Yamagata University, Graduate School of Science and Engineering; Yamagata, Japan 2009 (6 pages).

Pereira et al., Merging Electronic Document Redraws, unpublished U.S. Appl. No. 13/006,259, filed Jan. 13, 2011, pp. 1-30.

Pereira et al., Merging Electronic Document Redraws, unpublished U.S. Appl. No. 13/282,753, filed Oct. 27, 2011, pp. 1-30.

Quinn, "Comparing Online vs. Traditional Office Software, Will desktop or online office software fit your non-profit needs best?" May 21, 2010, courtesy of Idealware, TechSoup.org [online]. Retrieved from the Internet L:http://www.techsoup.org/learningcenter/software/page11852.cfm (4 pp.).

Raman, T.V., "Cloud Computing and Equal Access for All," Google Inc., 2008 (4 pages).

Shen et al., Integrating Advanced Collaborative Capabilities into Web-Based Word Processors, Nauyang Technological University, School of computer Engineering; Singapore, 2007 (8 pages).

Sun et al., "Operational Transformation in Real-Time Group Editors: Issues, Algorithms, and Achievements," 1998, ACM Conference on Computer-Supported Cooperative Work, pp. 1-10.

Tyson, Herb, "Microsoft Word 2007 Bible," 2007, pp. 112-115, p. 467, pp. 523-525, p. 798.

Unpublished U.S. Appl. No. 13/166,844, filed Jun. 23, 2011.

Unpublished U.S. Appl. No. 13/224,530, filed Sep. 2, 2011.

Unpublished U.S. Appl. No. 13/274,382, filed Oct. 17, 2011.

Using Adobe Buzzword, Adobe Systems Inc. and its Licensors, 2008, pp. 1-32.

Wang et al. Google Wave Operational Transformation, Jul. 1, 2010, 1-6, retrieved from the Internet Feb. 14, 2012: http:/1 wave-protocol.googlecode.comfhg/Whitepapers/operational-transform/operational-transform.html.

Wikipedia, "Operational Transformation," http://en.wikipedia.org/wiki/Operation_transformation, Jun. 3, 2008. Retrieved from Internet: http://web.archive.org/web/20080603061805/http://en.wikipedia.org/wiki/Operational_transformation.

Wikipedia, the free encyclopedia, "Model-View-Controller," downloaded on Nov. 16, 2010 [online]. Retrieved from the Internet: URL:http://en.wikipedia.org/wiki/Modei%E2%80%93view%E2%80%93controller, pp. 1-10.

M. Miller, "Googlepedia: The Ultimate Google Resource," Third Edition, pp. 1-24 (pp. 276-287 in original source) Que (Indianapolis) 2009.

Office Action dated Dec. 3, 2012 for U.S. Appl. No. 13/085,292.

"Google Docs 4 Everyone" http://www.scribd.com/doc/14119795/Google-Docs-4-Everyone Published Feb. 2009 by Steven Holzner.

* cited by examiner

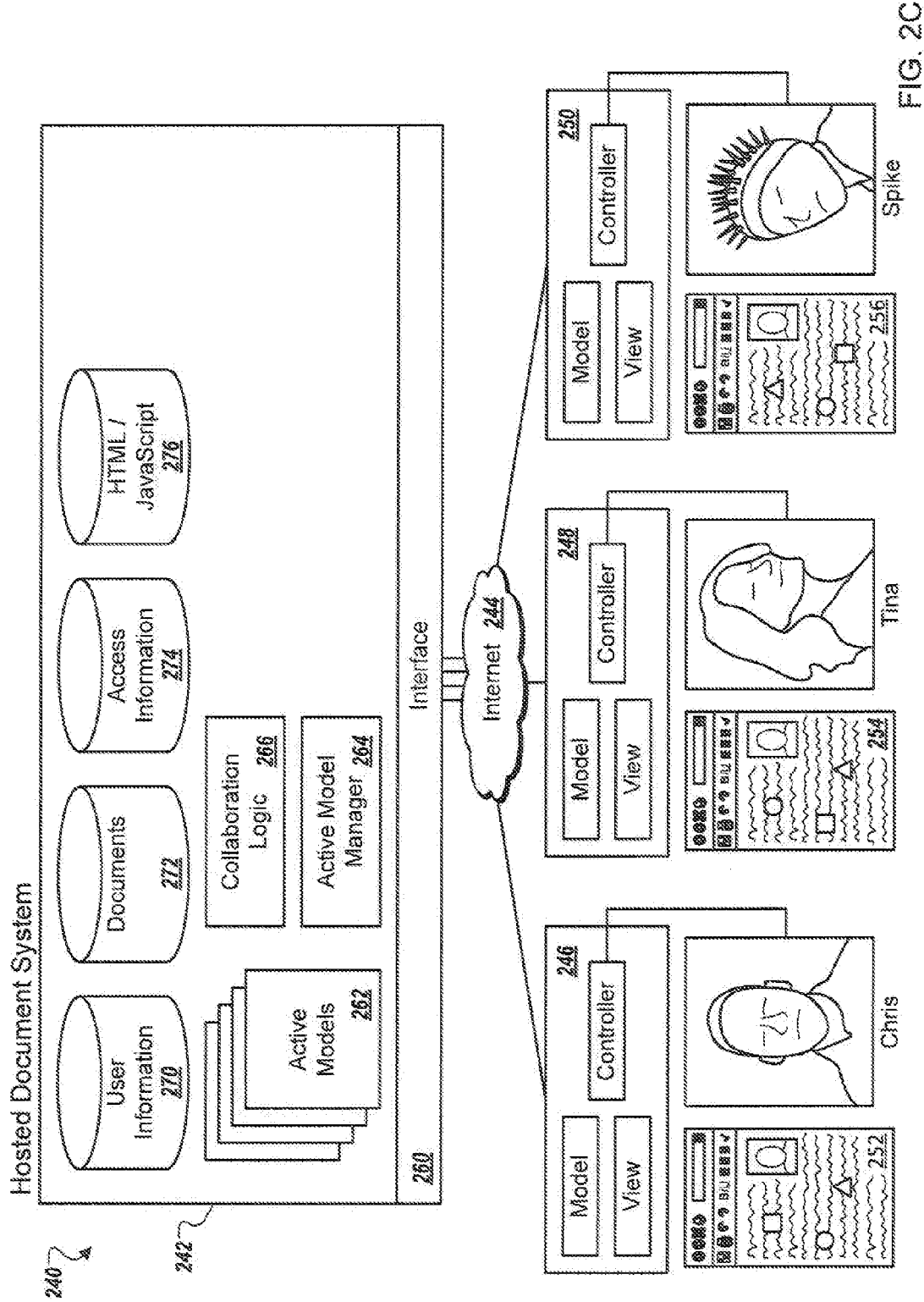

FIG. 5B

| | A | B | C | D | E | F | G | H |
|---|---|---|---|---|---|---|---|---|
| 1 | REGIONAL MANAGER | FOOD | JANUARY FORECAST | FEBRUARY FORECAST | MARCH FORECAST | UNITS | TOTAL ($) FORECAST | PRODUCT SIZE (US) |
| 2 | OTHMAN | WHOLE GRAIN WHEAT | $4,939,232 | $8,558,834 | $5,337,950 | 56 | $13,498,066 | 1003 |
| 3 | | CRUMB CAKE | $4,598,332 | $9,223,534 | $4,772,950 | 45 | $17,544,616 | 5678 |
| 4 | | PIZZA DOUGH | $263,000 | $170,000 | $105,000 | 6 | $493,000 | 8765 |
| 5 | | APPLE PIE | $14,500 | $85,000 | $162,500 | 7 | $262,000 | 3215 |
| 6 | | | $18,000 | $5,000 | $105,000 | 232 | $128,000 | 5436 |
| 7 | JAMES | PINEAPPLE | $263,000 | $170,000 | $304,939 | 13 | $128,000 | 13 |
| 8 | | BREAD | $625,121 | $3,807,500 | $2,086,000 | 45 | $5,688,621 | 45 |
| 9 | | CHICKEN | $621,619 | $3,007,500 | $2,086,000 | 6 | $5,665,119 | 6 |
| 10 | | | $263,000 | $170,000 | $42,775 | 0 | $1,323,000 | 0 |
| 11 | KANYE | BANANA | $1,111,306 | $1,300,000 | $1,204,999 | 45 | $3,616,300 | 9 |
| 12 | | APPLE | $70,800 | $10,000 | $42,775 | 6 | $80,800 | 6747 |
| 13 | | GRAPE | $240,001 | $578,000 | $504,999 | 7 | $1,323,000 | 1234 |
| 14 | | TOMATO | $800,500 | $712,000 | $700,000 | 6 | $2,212,500 | 34123 |
| 15 | NAOMI | BARLEY | $0 | $0 | $0 | 0 | $0 | 0 |
| 16 | | RYE | $34,333 | $34,333 | $34,333 | 45 | $102,999 | 423 |
| 17 | | WHEAT | $60,400 | $42,775 | $42,775 | 6 | $145,950 | 1024 |
| 18 | BROOK | | $0 | $0 | $0 | 7 | $0 | 13456 |
| 19 | | | $130,000 | $145,000 | $145,000 | 232 | $420,000 | 1324 |
| 20 | | | $67,500 | $6,358,000 | $6,470,000 | 13 | $12,895,500 | 13 |
| 21 | BARNEY | SAUSAGE | $263,000 | $170,000 | $42,775 | 45 | $1,323,000 | 45 |
| 22 | | SALAMI | $4,939,232 | $8,558,834 | $5,337,950 | 6 | $18,836,016 | 6 |

COLLABORATIVE CURSORS IN A HOSTED WORD PROCESSOR

CROSS-REFERENCE TO RELATED APPLICATIONS

This application is a continuation of U.S. Ser. No. 13/085,292 filed on Apr. 12, 2011, which claims priority to U.S. Provisional Application Ser. No. 61/323,259, filed on Apr. 12, 2010, entitled "Collaborative Cursors in a Hosted Word Processor." The disclosures of those applications are incorporated herein by reference.

TECHNICAL FIELD

This document relates to systems and techniques for managing and displaying locations of cursors for users who are collaboratively editing an electronic document on a hosted server system.

BACKGROUND

Cloud-based, or hosted, computing generally involves executing applications via a web browser, and obtaining information for the applications from a remote server system or service. Cloud computing provides real advantages over traditional desktop software, such as the ability to access documents from various different computers and locations. Office productivity applications are one type of application currently be delivered by the cloud. For example, users can employ their web browsers to edit word processing and spreadsheet documents that are stored on hosted server systems, may access enterprise resource planning (ERP) applications, may edit photos, and may perform most other activities that they could previously perform with desktop productivity software.

In a hosted system, users may also be permitted to access the same document simultaneously. For example, the server system may maintain a master document and may communicate changes to the document to various client computing devices that are accessing the document over the internet. Such collaborative editing may permit for an improved experience over systems in which each user makes a batch of edits to, a document, and then forwards it on to another user, where there is no ready feedback loop to correct edits made by one user when another user knows that the edits are not advisable.

SUMMARY

This document describes systems and techniques that may be used to display information to users of a hosted word processing system who are in the document at the same time and are editing the document simultaneously (where "simultaneous" indicates the ability to have overlapping editing in a common session, and does not require literal simultaneity). As described here, each user's client device may frequently report to a server system changes, or mutations, that the particular user has recently made to their version of the document. Such reports, which may occur on the order of multiple reports per second when the user is making mutations (e.g., is typing), may be accompanied by data that tells the server system where the user's cursor is located in the document (e.g., between which characters in a character string that represents the content of the document). The server system may resolve the mutations with other mutations it has received from the other users (e.g., if they interfere with each other) and may send updated coordinated mutation information out to all of the client devices that did not submit the corresponding mutations, and may send with such data the data that indicates the positions of the other user's cursors.

Such features may, in certain implementations, provide one or more advantages. For example, a browser-based document may be displayed to, and edited by, multiple users at a time in a collaborative editing session. Each of the users may be visually anchored in being able to see a cursor that marks the editing location for each of the other users. As a result, the particular user may be induced to avoid editing in the same area as the other users, so as to avoid collisions in entered edits.

In one implementation, a computer-implemented collaborative editing method is disclosed. The method comprises receiving input from a user of a browser-based document editing application on a document displayed by the application; identifying a current location in the document for a cursor of a first user executing the application; receiving from a central server system data that reflects changes made to the document by one or more users other than the first user and current positions in the document of cursors for the one or more other user; updating a document model stored on a computing device that is executing the browser-based application and rendering at least a portion of the model to the browser; and rendering the current positions of the cursors for the one or more other users to the browser. The method can also comprise receiving updated information regarding current positions of the cursors for the one or more other users in the document, and rendering the current positions of the cursors for the one or more other users. Moreover, the method can include transmitting to the central server system data that describes changes to the document made by the first user, and identifying a current location in the document for a cursor of the first user.

In some aspects, the method comprises transmitting the data describing changes in the document and identifying a current location for a cursor of the first user more than once per second during periods of active editing activity by the first user. The method can also comprise detecting when the first user is actively editing the document, starting a timer when the first user begins editing the document, and transmitting accrued data from the user's editing activity when the timer expires. Moreover, the method can include setting the timer for a period less than 500 milliseconds, and can also comprise setting the timer for a period equal to or less than 250 milliseconds. In addition, the method can also comprise transmitting the data describing changes in the document and identifying a current location for a cursor of the first user more than once per second during periods of active editing activity by the first user.

In another implementation, a computer-implemented collaborative editing system is disclosed, and comprises an interface for receiving communications from a plurality of client devices editing electronic documents using web browsers, including information indicating locations of a cursor in a document in which a particular user is active; an active model manager to identify users other than the particular user who are active in the electronic, document; and collaboration logic, to provide the users other than the particular user with information that reflects changes made to a model for the electronic document and locations in the document of a cursor for the particular user.

The details of one or more embodiments are set forth in the accompanying drawings and the description below. Other

DESCRIPTION OF DRAWINGS

FIG. 2C is a block diagram of a system for permitting collaborative editing of a documented by multiple users through a hosted server system.

FIG. 5B shows a screenshot of a spreadsheet document being edited collaboratively by multiple users.

Like reference symbols in the various drawings indicate like elements.

DETAILED DESCRIPTION

This document describes systems and techniques for coordinating simultaneous editing of an electronic document by multiple different users who are separated from each other, and from a server system that is hosting the interaction, by the internet. Thus, the techniques discussed here can provide a good user experience while editing a rich document (i.e., a document that can include formatting, images, and other content that goes beyond simple text) in a cloud, or hosted, computing paradigm. As discussed herein, changes that various users make to a document may be represented as mutations that are communicated to a central server system that serves as a referee when the mutations interfere with timewise overlapping changes by other users, and forwards the mutations (perhaps after processing them into another form) to the users who are not the source of the particular mutation or group of mutations in interest. This broadcasting of mutations may occur very frequently when a user is making changes to a document, such as on the order of once every few seconds, once every second, or multiple times per second. Also, the mutation information may be accompanied by information from the first user that indicates the current location of that user's cursor in the document, and information that identifies the user. As a result, when the other users' computing devices receive such information, they may generate a cursor for the first user (though in a color or shape that differs from that of their own cursor), and may also display a tag or flag that shows the first users handle or name. To minimize visual interference, such a flag may be displayed only when the remote user who corresponds to the cursor is actively editing (e.g., has typed in the last few seconds) or when the local user hovers a pointer over the other user's cursor.

Figure 1:
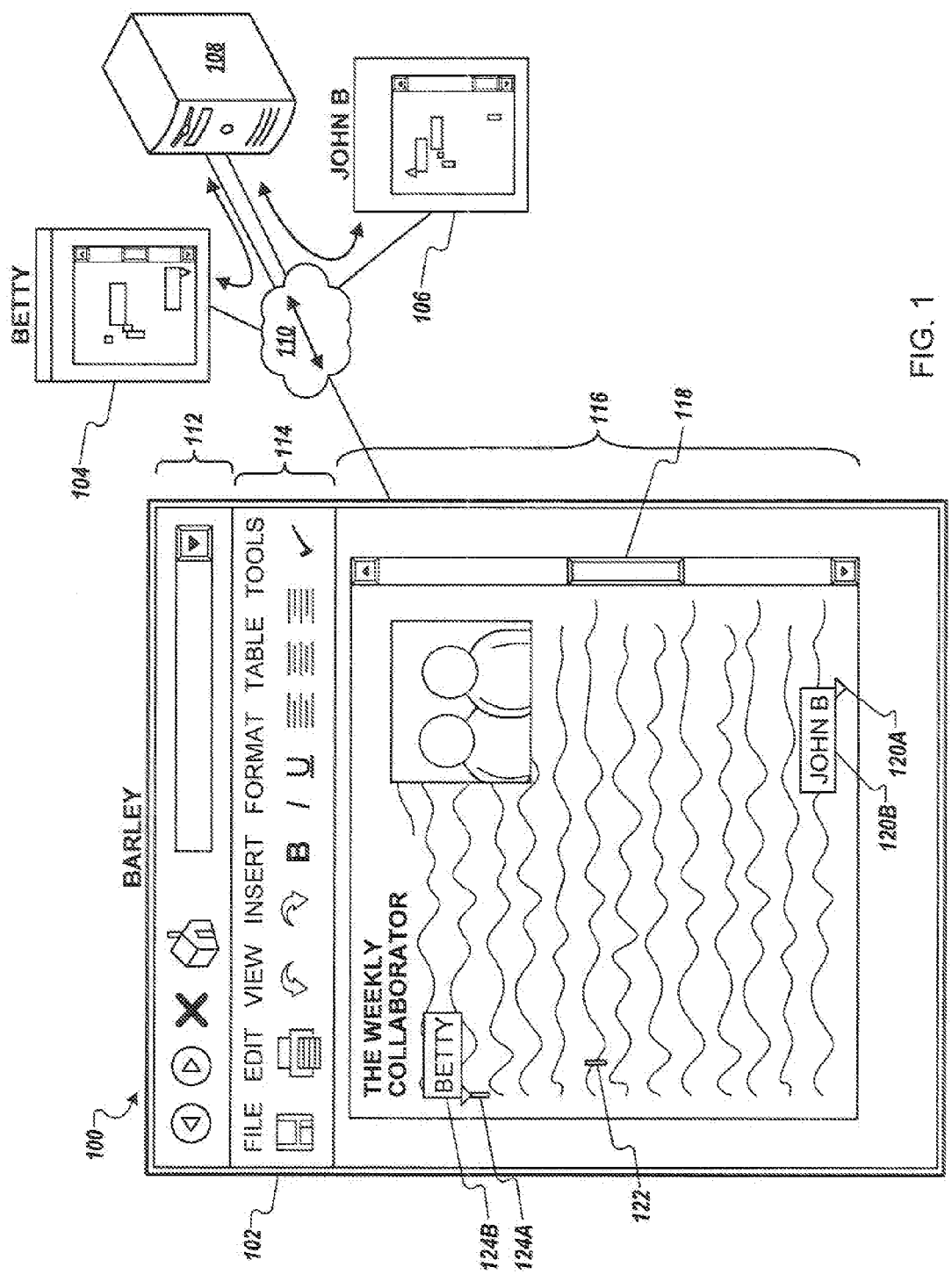
FIG. 1 is a schematic diagram of a system for coordinating cursor locations in a collaborative document editing situation.

FIG. 1 is a schematic diagram of a system 100 for coordinating cursor locations in a collaborative document editing situation. In general, the system shown here is a hosted word processing system that multiple users can access at the same time in order to collaboratively edit a common document with each other. Shown schematically here are corresponding web pages for three different users who are working on a newsletter called the "Weekly Collaborator." Page 102 is being edited by a user named Barley; page 104, which may be generated by a client computing device that is remote from page 102, and accessed through a network 110 such as the internet, is being operated on by a user named Betty; and page 106 is being operated on by a user named JohnB. Each of the pages, or more particularly each of the web browsers that are generating the pages, may communicate through the network 110 with a hosted server system 108. The system 108 may be operated by a company that provides a variety of hosted services, such as search results, mapping results, payment transactions for shopping online, translation tools, and other similar services in the cloud.

Page 102 is shown as having a toolbar 112 near its top edge which may display browser buttons and a search box for entering search queries in a familiar manner. Below the toolbar 112, there is displayed chrome 114 such as in the form of pull down menus and selectable icons that may cause formatting changes to be made to the document that is being edited in the browser page 102. Additional chrome such as scrollbar 118 may be provided where the document is larger than the viewport that will fit on the page 102. A handle on the scrollbar 118 may be selected by a user to bring other portions of the document into view at one time. As described below, the system may follow a model-view-controller arrangement, so that a model of the document may be stored on a client device, and may be rendered to a document object model (DOM) that may then be displayed on the page 102. Where the document is much larger than the viewport, it may be more efficient to render only a portion of the document at or around the viewport, and to defer rendering or even downloading from the server to the client, the remainder of the document model.

In this particular example, the users of page 102, page 104, and page 106 are all editing the newsletter furiously to meet an impending deadline. As such, each of them has their cursor located at a different portion of the document from the others, and they are typing text and deleting text from the document as they edit. Using the techniques discussed here, a controller executing on each of the users' client computing devices may intercept such keystrokes and other inputs, and may send information about those keystrokes as mutations to the server 108. Such information may include, for example, a location indexed to the content of the model where the edit is currently taking place or has occurred, and a location indexed to the model where the particular user's cursor is currently located. In addition, information for identifying the particular user may be provided so that, as described in more detail below, the server 108 may provide information that identifies cursor location for users other than the local user.

With respect to the cursor positions, cursor information for all three users is shown on page 102. The cursor information for Barley, the local user, is shown by cursor 122. The cursor 122 and other cursors may be generated as span elements having a narrow width, in a background color that contrasts with the background color of the document that is being edited. The location for the cursor may be determined by identifying a starting location for the cursor and then, as characters are entered, by generating the characters in an off screen div element using the appropriate character size and formatting, and then using standard HTML elements to determine the height and width of such an off screen element. Such a user-entered character may then be provided to the DOM and displayed on the page 102, and the position of the cursor 122 may be indexed forward by the width of the off-screen element, so that the cursor is now to the right of the newly added character, and indicates to Barley, the local user, that his next keystroke will be at that location. In this manner, the cursor 122 and the text and other portions of the document being edited may all be synthetically generated so as to provide a visual impression that matches the format that the particular author intended.

A cursor 124A is shown for Betty, as editing the document above the location at which Barley is editing the document. A flag 124B is appended to the cursor, so that Barley may immediately recognize that Betty is performing the particular editing. Thus, for example, Barley may know that Betty is an expert in the topic around the area where she is editing and may pay less attention to her edits. In contrast, Barley may know that the area in which Betty is editing is an area that he cares deeply about, and he may watch Betty's edits very closely and provide comments to her if she changes the document in a way that he does not like. For example, he may paste a marginal note to the document, he can edit Betty's edits, or he can type a note into a chat session that may be executing automatically with the word processing application.

JohnB is editing the document at a location far below that of the other two users, and off the current viewport on page 102. As a result, the cursor for JohnB is shown only as a small caret 120A that is appended to a flag 120B, and points downward off the page to indicate to Barley that JohnB is somewhere horizontally in line with the caret 120A, but off the bottom of the page.

Pages 104 and 106 show corresponding icons and flags that may be displayed to the other users. In particular, those users may have their locations marked merely with an icon like icon 122, and may have the locations of the other users marked with differently-colored icons and possibly appended with a flag or other note that identifies the user that is editing at that location.

The flags shown here may be turned off in certain situations so that the local user may more readily see the page 102. For example, if Betty stops typing for a predetermined period, such as for 5 seconds or more, the flag 124B may disappear, and only icon 124A may be shown. In this way, an appropriate level of alerting may be provided to a user without overwhelming the visual interface.

Effective collaborative editing may be obtained in such a situation by having a controller, like the controller discussed below, intercept user inputs and send them as mutations to the server system 108 frequently. For example, when a long period has passed without input from the user, and the user starts providing input, a timer may be started and all inputs cached when the timer has expired may be sent as a batch of mutations to the server system 108. The timer may be set for example, a period of three seconds, two seconds, one second, or a fraction of a second, such as by sending uploads to the server system 108, when a user is providing active input, every 200 ms (milliseconds). The server system 108 may then revise such mutations that are passed to it if it has identified that there is a collision between inputs by the users, and may pass the revise mutations back to the other clients. Such information may be accompanied by information that identifies the user who is making the edits and also the location within the document model for the cursor of that user. Such information may be processed by the other client systems, such as by a layout engine generating a span element of a narrow width in a background color that contrasts with the background for the particular user's document. The cursor as a span element may then be placed on an editing surface for page 104 or 106, and may be viewed by the users of those pages.

This process of intercepting user interactions, determining locations for cursors at the present time, and passing such information up to server 108 and back down to the other clients may occur repeatedly throughout a session of editing a document, until one of the users logs out of the session and their cursor is no longer shown, or until all of the users log out of the session, and the most up-to-date model is the model currently on the server 108. In such a situation, the copies of the model at each of the clients may be cached and reused the next time the users log back into the system, if the server model has not changed from that time, or may be discarded (since the central model can be downloaded at a next session).

Figure 2A:
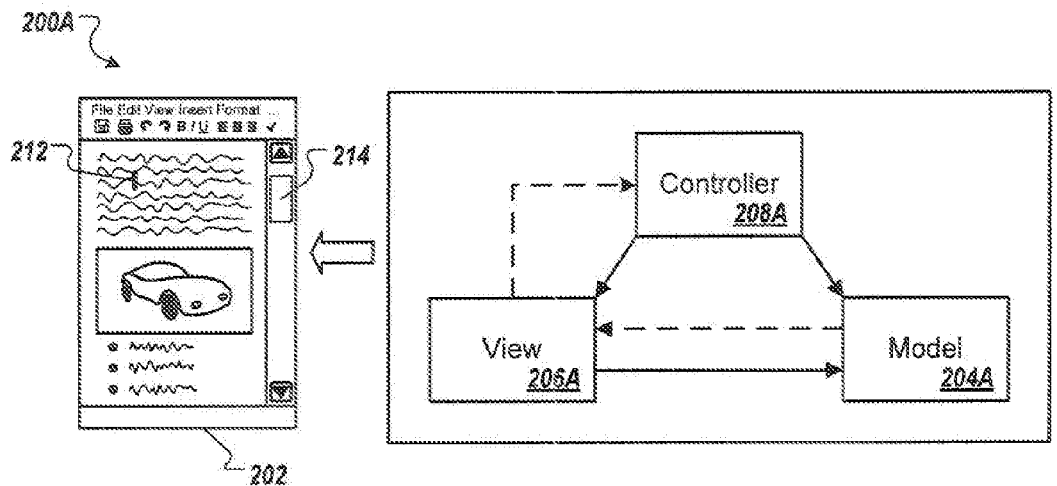
FIGS. 2A and 2B are block diagrams showing components of a model-view-controller implementation of a spreadsheet application.
Figure 2B:
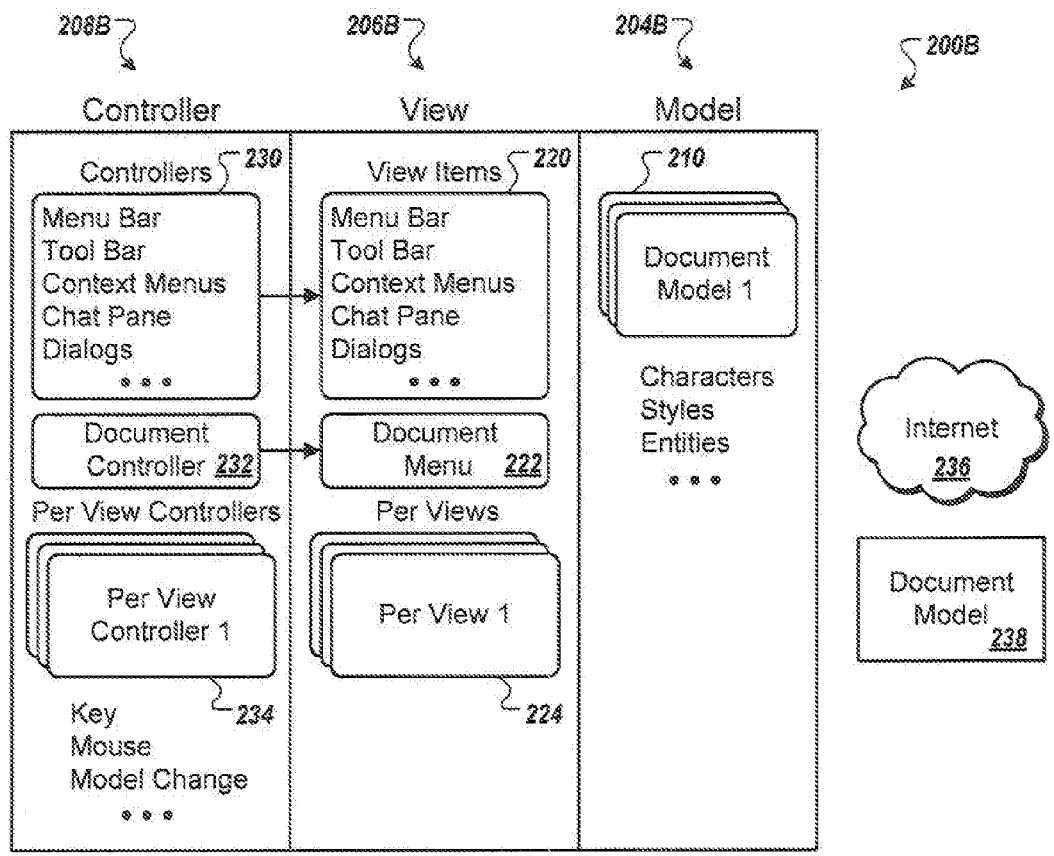

FIGS. 2A and 2B are block diagrams showing components of a model-view-controller (MVC) implementation of a word processing application. The word processing application, for example, may be executed by a web browser, such as the browser 104 shown in FIG. 1A. In general, the MVC implementation provides for the download of a model from a remote server to a client, and the rendering of the model into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server (e.g., uploading changes or mutations back to the server, which may be programmed with rules for integrating the mutations into a master model, so that the client-side model matches the master model as the user works).

Referring to FIG. 2A, a computer application 200A may be configured to display a word processing document 202. The application 200A includes, controls, or accesses a model 204A, a view 206A, and a controller 208A. For example, the model 204A can contain a representation of the state of the word processing document 202, including such elements as character data, formats, styles, paragraphs, sections, breaks, lists, tables, images, formulas, and the like. The view 206A can represent a rendering of the current state of the model 204A. For example, the view can provide a visual representation that combines the substance of the document (e.g., its raw text) with formatting and layout information. The view, when displayed by a browser, provides a form of, if not an exact, WYSIWYG representation of the document that is defined by the model.

In addition to the rendering of the model, the view 206A can be used for presenting to the user visual information that is associated with the word processing document 202, such as visible user controls for the application (i.e., chrome) and other word processing data. The controller 208A can respond to changes in the model 204A or the view 206A, and can update the state of the model 204A and the view 206A. As shown in FIG. 2A, solid lines between the model 204A, the view 206A, and the controller 208A represent direct references between components, and dashed lines represent listeners. For example, listening for user interaction (e.g., provided by user controls) with the presentation of the view 206A, the controller 208A can modify the model 204A, and can in turn modify the view 206A either directly or indirectly (by causing the view 206A to obtain new model data and render that new data).

As another example, listening for changes in the model 204A made by another user in a collaborative environment or changes made through an automated data update or another such process, the view 206A can request re-rendering of an updated model or portion of the model. For example, if a user of a client device is only one of multiple users concurrently editing a document, characters and other edits by the other users may be passed to the client device from the server system (and edits by the first user may be passed from the client device to the server system), and the client code may add characters to the model in near real-time, and those changes can be passed into the DOM (e.g., via rendering, by the view 206A)—so that each user can see the edits made by the other users very quickly.

Referring to FIG. 2B, the model-view-controller implementation as presented in FIG. 2A is shown with additional detail. As shown, a computer application 200B (corresponding with the application 200A) includes, controls, or accesses a model 204B (corresponding with the model 204A), a view 206B (corresponding with the view 206A), and a controller 208B (corresponding with the controller 208A).

The model 204B can include one or more document models 210. Each of the document models 210 can represent a separate document in a collection of word processing documents, for example, and each of the models 210 can include elements such as characters, styles, and entities. Other forms of documents such as spreadsheet documents may also be represented. Model data and elements may be provided by a master document model 238 that is stored on a remote server system via a connection to a network 236 (e.g., the internet).

Generally, document text in the models 210 is associated with a series of characters. For example, the characters may represent raw text for the word processing document 202, and may also include certain reserved control characters such as characters that indicate the occurrence of a break (e.g., a paragraph break, a page break, or the like). In some implementations, each of the document models 210 can include a one-dimensional character string that includes document characters in an order in which they appear in the document.

Styles may be used to store information related to the presentation of document text (e.g., the series of characters). For example, text styles may include character formatting attributes such as font, font size, bold, italics, underline, foreground and background colors, alignment, and other such attributes. In some implementations, styles included in each of the document models 210 can be stored in a sparse map. For example, the sparse map can include markers that correspond to changes in styles in the document and pointers to positions in the character string. The pointers, for example, can define style runs, between matched markers by specifying locations along the character string at which style changes occur. In some implementations, the markers in the matched set may be arranged to be tethered to certain characters in the one-dimensional character string. For example, if text is added between two paired markers, the pointer for one of the markers may shift by an integer equal to a number or characters associated with the added text.

Entities in each of the models 210 may be used to store information related to objects outside of the document models 210, and may be pointed to by references in the model such as in the one-dimensional character string. For example, entities may include objects such as lists, tables, images, and the like. In some implementations, the references can include object identifiers and pointers to the one-dimensional character string (e.g., from the sparse map) indicating where in the character string the object should appear, or identifiers from within the character string that point to the entities and mark the locations at which the particular entities are to appear in the document when it is rendered and displayed. For example, an image that should appear between two paragraphs may be associated with a special character appearing in the character string after a paragraph marker for one paragraph, and before the first character of the next paragraph.

The view 206B can generate one or more view items 220 that may enable the user to interact with the application 200B, such as menu bars, tool bars, context menus, chat panes, dialogs, other chrome, and the like. The view 206B can also include a document menu 222 that presents information and control options related to one or more of the document models 210, and one or, more of a set of per views 224. For example, one of the per views 224 may be associated with a corresponding one of the sheet models 210. Each of the per views 224 may include components or controls such as selectors (e.g., cursors, selection indicators, and the like) navigation tools (e.g., scrollbars, document maps, outlines, and the like).

The controller 208B can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and, handle user interactions with tool bar view items, context menu controllers may listen for and handle user interactions with context menu view items, and so forth. The determination that a particular event has occurred may cause a particular controller 230 to execute predetermined code or otherwise carry out a predetermined process, such as by updating a local model when a key press is received and uploading information about the key press to a central server system.

The controller 208B can also include a document controller 232 that may listen for and handle user interactions with the document menu 222. In addition, the controller 208B can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208B can transform user-generated events into model and view mutations. For example, based on a user action, a relevant controller (e.g., a controller configured for handling the action) may receive one or more events associated with the action and make transient changes to the view 206B before the user action is committed. Then, based on the event properties, the relevant controller can construct a command to mutate the model 204B, execute it, and send the updated model or just data for the particular mutations to the remote server system that hosts the document model 238 via the network 236.

The controllers may also use timers or other mechanisms to aggregate inputs or mutations, so as to lower the number of updates that need to be made to the local or server-based models. For example, the controllers may implement changes to the local and/or server-based model in batches that occur within predefined time windows, such as by waiting 200 ms after an initial keystroke is, sensed before sending to the central server system data about all keystrokes received in the time window.

Many possible user interactions with the application 200B are possible, including interactions that are included in single-user sessions and, in multiple-user sessions. For purposes of illustration, a series of example user interactions with the application 200B are described here. For example, to enter text into the word processing document 202, the user may proceed by using a computer mouse to select a desired document location 212 for text insertion by clicking on the document 202. A mouse controller that is included in the per view controllers 234 (e.g., a per view controller associated with the active document 202) can listen for an event that is associated with the mouse positioning input and the mouse click input, and upon intercepting it, can modify the view 206B (e.g., a per view associated with the active document) to provide the user with a visual indicator for the selection (e.g., a cursor). For example, the selected location 212 may be associated with a visible cursor (where the cursor is a graphical HTML element such as an image, and is displayed at an appropriate location on a canvas where the document is also being displayed so as to create a synthetic presentation that makes the graphical element look like a true cursor), may be highlighted, or may receive another such modification. Additionally, the selected location 212 may also be associated with a location in the model 204B. For example, a position in a one-dimensional character string included in the document models 210 can be determined, based on the selected location 212.

Using a keyboard, the user may enter desired text at the document location 212. A keyboard controller that is included in the per view controllers 234 can listen for events associated with the keyboard input, and upon intercepting them, can modify the view 206B to provide the user with a visual indicator for the input. For example, as the user types text at the location 212, the document 202 may be visually updated to present the text to the user. Additionally, the keyboard controller can modify the model 204B to include entered text by copying the user input to the model. For example, a one-dimensional character string included in the document models 210 can be updated to include the entered characters. Additionally, the document model 238 may be updated to include the entered text, thus coordinating the model 204B with the document model 238. For example, changes to the model 204B may be transmitted to the document model 238 via a connection to the network 236. In some implementations, changes may be sent periodically (e.g., once every 100 milliseconds, once every 200 milliseconds, once every 600 milliseconds, once every second, once every 2 seconds, or another appropriate time interval). In some implementations, changes may be sent based on user activity (e.g., entering a paragraph break, applying a formatting change, navigating to another document section, clicking a save button, or some other action).

As another example, the user may insert an entity (e.g., a list, a table, a hyperlink, an image, or another such object) into the document 202. For example, the user may proceed by using a computer mouse to select a desired document location (e.g., the location 212) for entity insertion by clicking on the document 202. Similar to interactions associated with text entry, for example, a mouse controller included in the per view controllers 234 can listen for an event associated with the mouse positioning input and the mouse click input, and upon intercepting it, can modify view 206B to provide the user with a visual indicator for the selected location. Next, for example, the user may specify the entity for insertion by interacting with one of the view items 220 or with the document menu 222. For example, the user may make a selection on a menu bar to indicate an intent to insert an image. A dialog associated with image selection may be presented to the user, enabling the user to select the desired image.

Model-view-controller interactions for adding the entity within the application 200B may operate in a similar manner as when a user is entering text. For example, as the user inserts the image at the location 212, the document 202, as it is displayed on an editing surface, may be visually updated to present the image to the user. Additionally, the model 204B may be modified to include a reference to the inserted image by writing the reference to the model. For example, one of the document models 210 (e.g., the model associated with the active document) can be updated to include a reference to the inserted image. A one-dimensional character string may be updated to include a special character indicating the position of the image, and the reference to the image may be stored.

When the document 202 is rendered from the model associated with the active document, for example, the image content may be integrated into the document 202 that is displayed to the user. In some implementations, the one-dimensional character string may include multiple instances of an identifier for a single entity. For example, the image may be positioned at multiple locations in the document 202, specified by multiple positions for the identifier in the one-dimensional character string. Thus, a single external entity may be shared within a document, or may be shared among multiple documents—both by common references to the external entity. The document model 238 may be updated to include the inserted image(s), thus coordinating the model 204B with the document model 238. For example, changes to the model 204B may be transmitted to the document model 238 via a connection to the network 236.

Additionally, for example, the user may modify the formatting of text and entities presented in the document 202. By interacting with one of the view items 220 or with the document menu 222, the user can indicate a desired formatting change (e.g., a change such as changing a font of a selected text block to bold, changing a group of words to be organized as a list, changing a paragraph justification to be right-aligned, changing a document line spacing to be double-spaced, and the like). One of the controllers 230 or the document controller 232 can listen for user interaction with the view 206B, and upon detecting the interaction, can modify the model 204B to include the formatting change. For example, one of the document models 210 (e.g., the model associated with the active document) can be updated to include an element in a sparse map of styles defining the formatting change, and defining the locations along the one-dimensional character string at which the changes in style are to occur. A model change controller included in the per view controllers 234 can listen for events associated with the model 204B and can send a request to the view 206B to update accordingly (e.g., by rendering a display of formatted text). In some implementations, the model change controller may also handle model change events that result from collaborative model changes.

In some implementations, a document model that is one of the document models 210 may include a subset of the document data from the document model 238. For example, if the document model 238 is substantially large, a subset of the data (e.g., a subset associated with a portion of the document that is currently viewable by the user, plus perhaps a buffer area around the currently viewable area, or viewport, so that small scrolling distances may be handled by normal browser interactions without a need to render additional content form the model) may be provided to each client that is currently displaying the word processing document 202. As another example, the full document model 238 may be provided to each client.

The user may elect to view a different portion of the word processing document 202 than the user is currently viewing in the web browser. For example, by interacting with a scrollbar 214 that is associated with the document 202, the user may indicate an intent to view document data beyond the current viewport, or displayed area. One of the per view controllers 234 (e.g., the per view controller associated with the active document) can listen for user interaction with the view 206B or other appropriate component (e.g., the visual portion of the scrollbar 214), and upon detecting the interaction (e.g., via a computer mouse), can request for the view 206B to redraw itself.

If the user specifies a small amount of scrolling, the view 206A may cause itself to be displayed by the browser. For example, a buffer area of document data may be maintained in the model 204B (already rendered into a DOM) around the data that is displayed in the visible area of the document 202. If the amount of scrolling specified by the user is determined, by the view 206B to be within the bounds of the buffer area of data, the document display may be updated using such pre-rendered data. If the user specifies a larger amount of scrolling, such that the scrolling specified by the user is determined by the view 206B to be outside of the bounds of the pre rendered buffer data, for example, additional document data from the document model 238 may be downloaded via the network 236. Thus, the model 204B may be updated with information that is related to additional document sections, and the document may be rendered using the downloaded data.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browser 104, as shown in FIG. 1), and may include model, view, and controller components (e.g., similar to the application 200, shown in FIGS. 2A and 2B). The applications 246, 248, and 250 may be configured to execute computer code (e.g., JavaScript and other code running in a web browser) to display a word processing interface and to perform word processing functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be, unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242. As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group including the users. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single user sessions and in multiple user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browser 254, 256 for executing an online word processor. The browsers can include a portion of the HTML/JavaScript 276 as the browser applications 248, 250, can render chrome associated with the application, and can display the applications.

Additionally, an active model manager 264 included the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a squares, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 600 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed, so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. Although, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Figure 3:
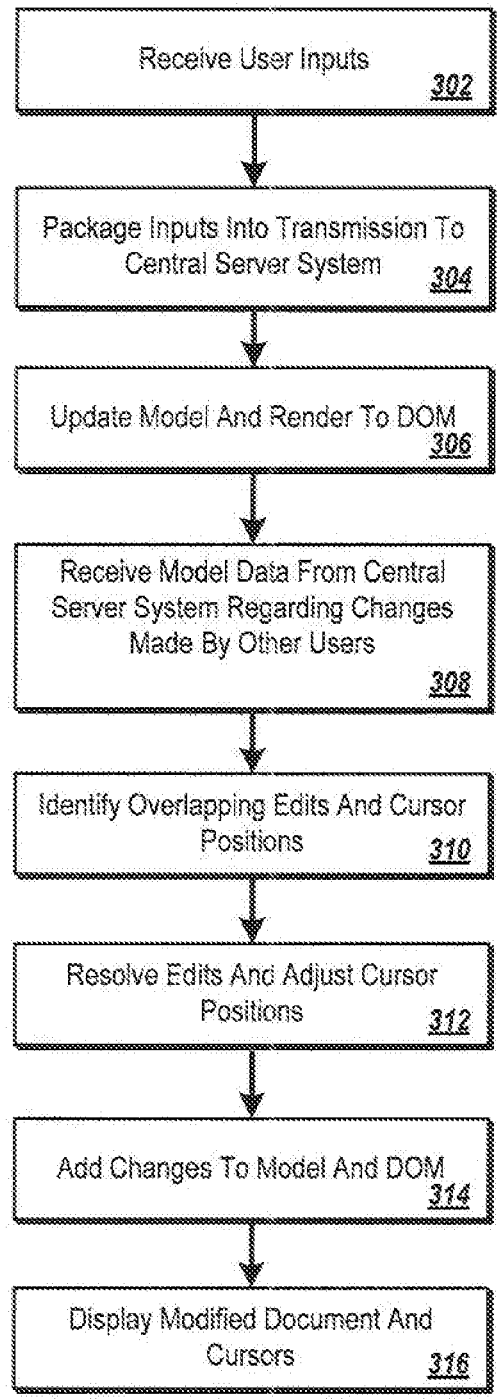
FIG. 3 is a flow chart of an example process for coordinating simultaneous changes to an electronic document.

Thus, the system shown in FIG. 2C may handle collaborative editing of a hosted document by multiple users at one time. The management of such editing can involve a low amount of data passing between the various sub-systems in the system FIG. 3 is a flow chart of an example process for coordinating simultaneous changes to an electronic document. In general, the process involves identifying changes in a document and document model made by a user of a client computing device, recording those changes as mutations, identifying a current location of a cursor for the user of the client device, and uploading such information to a server system, which may then share such information with other client devices, perhaps after reformatting or otherwise adjusting the information. This information may enable each of the client devices to show edits made by the other devices and the current cursor position of the other devices in real time on each of the local machines.

The process begins at box 302, where user inputs are received by a client device. These inputs may take a variety of forms, such as typing of text into a word processing, spreadsheet, or drawing document, or other appropriate changes. The input may also involve deleting text, inserting figures, and changing the format or style of elements in a document.

At box 304, the inputs receive from the user are packaged into a transmission to a central server system. Such information that is transmitted to the server system may include information that identifies the changes made by a user, and locations at which those changes are to be made in a document model that is being managed by the central server system. The changes may also include a revision number so that the central server system may track the order in which changes have arrived, and may use such information to resolve interferences between changes received from different users. In addition, the information may include identifying information for each user so that the users' identities may be shared with other users in a collaborative editing mode for a document.

At box 306, the client device updates its own version of the document model and renders that model or the updated portion of the model to a document object model (DOM) on the device that is accessible to a browser that will then display the document. At box 308, the device receives model data for the document from the central server system. This received information corresponds to information that other client devices provided to the central server system, similar to the information that the first local client device provided in box 304. Thus, the various users are making simultaneous edits, and the communications through the central server system are overlapping with each other.

In the time since the client device last communicated with the server system, the user of the device may have made edits on the device that affect or are affected by the edits made by other users on other devices. As such, overlapping edits may need to be identified, and transformations may be performed in a manner that matches transformations performed on the other clients and on the server system, so as to generate an updated document model at the local client. The client may also identify cursor positions of the other users, where such positions may be indicated directly in the data that was received form the server system. That data may be added to the local document, model, and rendered to the local DOM. Such data may also indicate an identifier, such as a username or handle, to associate with each cursor position. At box 312, the process resolves the edits and adjusts cursor positions for each of the other users that had a cursor previously displayed on the document display at the local client. For example, narrow span elements having background colors that contrasts with the background of the document may be moved within the DOM from their positions indicated in the last communication from the server system, to new positions indicated by the most recent communication from the server system.

At box 314, the changes are added to the model and by extension to the DOM, when the model is rendered to the DOM area, and at box 316, a browser displays the modified document and the cursors by accessing the DOM. The process shown here may repeat frequently, as noted above, such as repeating multiple times per second. As a result, cursor positions for other users may be frequently updated and may very closely match in time and location to cursor positions currently being seen by the other users on their own machines. As a result, multiple users may interact more smoothly because they can readily see the work that other users are performing in the document in real time.

Figure 4:
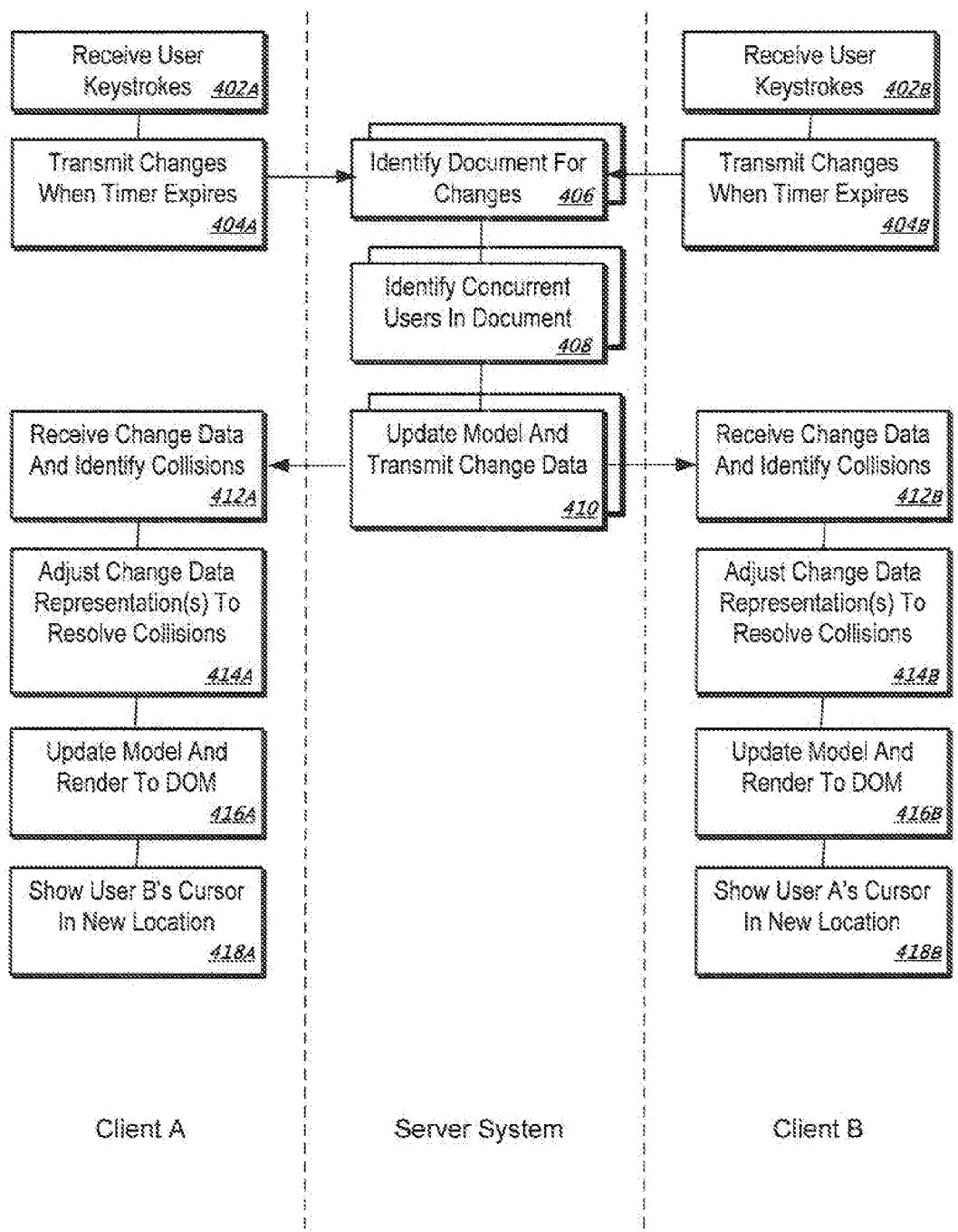
FIG. 4 is a swim lane diagram of an example process for coordinating simultaneous changes to an electronic document

FIG. 4 is a swim lane diagram of an example process for coordinating simultaneous changes to an electronic document. In general, the process shows an example in which symmetrical actions are taken by two different client computing devices that are both accessing a common document through a central server system to perform collaborative editing on the document.

The process starts at boxes 402A and 402B, where each of the users at the two client devices begins editing a shared document nearly simultaneously. At boxes 404A and 404B, each of the client devices may transmit those changes to the server system, such as when a timer expires, or for every keystroke or similar change that is identified on one of the clients. At box 406, the server system identifies the document as being edited by the particular user, and in this example, may perform such actions for the two different client devices in parallel, as shown by the stacked boxes in the middle column. The actions may also be stacked in a queue, and handled in the order in which they were received. The server system 408 may also identify other users who are currently in the document and active, so that it may determine which other users to share the information that it is received. At box 410, the server system updates its master copy of the document model and transmits change data to the respective clients, or data associated with the changes from client B will be sent to client A., and changes associated with client B will be sent the client A.

At boxes 412A and 412B, the clients receive the change data from the central server system and identify potential collisions created by the edits from the other client when compared to the edits made on the local client. At boxes 414A and 414B, each of the client devices adjusts its change data representations to resolve such collisions and then, at boxes 416A and 416B, the client devices update their respective models and render them to the respective DOMs on browsers running on the clients. Finally, at boxes 418A and 418B, the clients change the data in the DOM relating to cursors of other users, and shift the representations for those cursors to new positions represented in the data received from the server system at boxes 412A and 412B.

The process shown here may be a continuous process, in that each client may be continually listening for input made to the users and may transmit the input in batches that may be batches of single inputs such as keystrokes or in slightly larger batches, where the batch size is generally selected to be small enough that inputs may be transmitted to other clients frequently enough to provide a smooth user experience in a collaborative session.

Figure 5A:
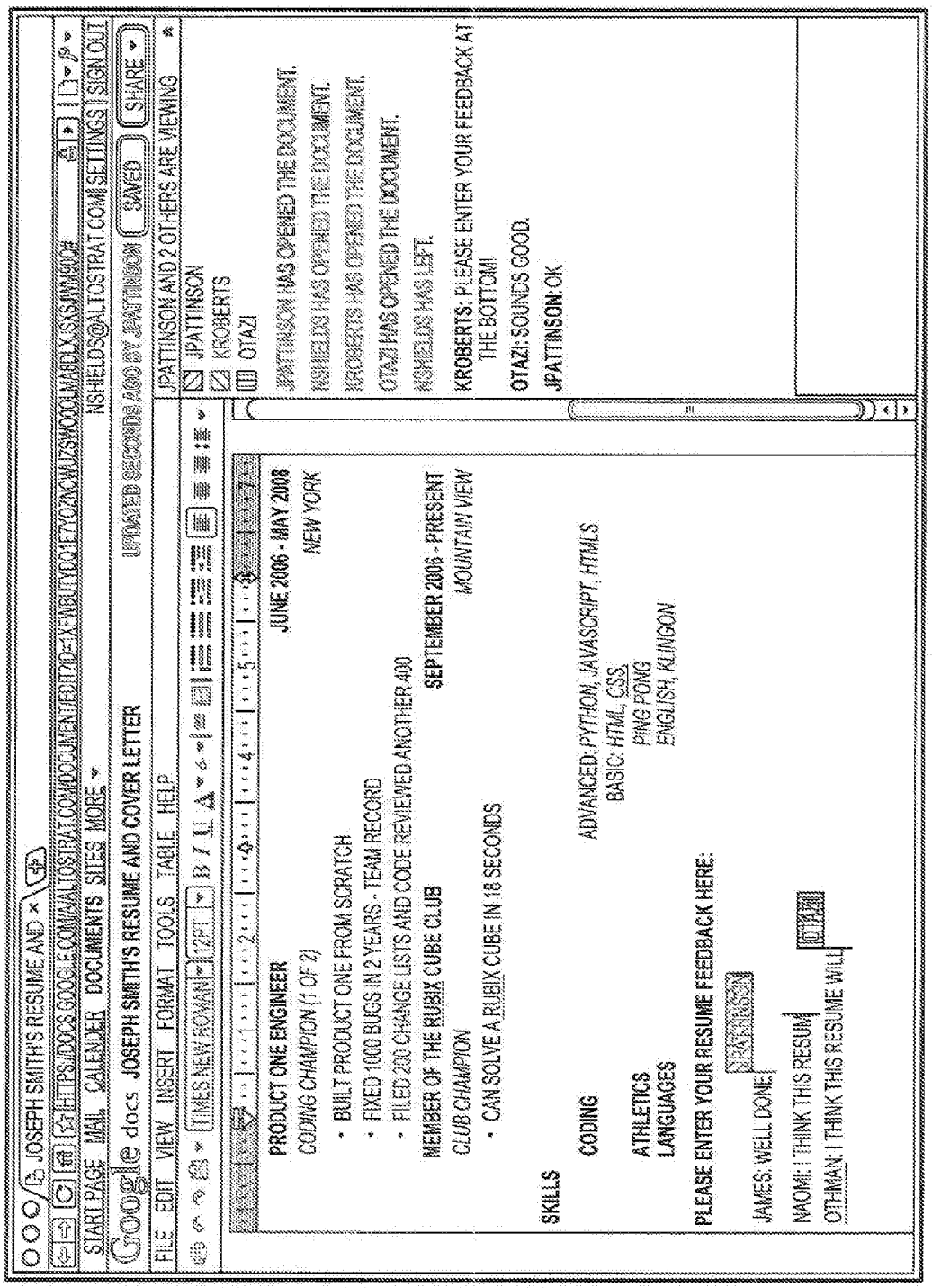
FIG. 5A shows an example screenshot of a word processor that is implementing a collaborative editing session.

FIG. 5A shows an example screenshot of a word processor that is implementing a collaborative editing session. In this example, there are three users looking at a resume of Joseph Smith and typing comments at the bottom of the resume. The particular screenshot shown here is a page user named kroberts, as indicated by the fact that an cursor in the middle of the three lines near the bottom of the resume is not accompanied by a flag with a name to it. Presumably, the local user (kroberts here) does not need to see her own name next to her cursor, and also by omitting the flag, the cursor stands out more prominently as compared to the other cursors that look more like each other. The other users, James Pattison and a user named otazi are typing at the same time as kroberts such that if the figure were animated, one would see the three vertical cursor bars moving across the page from left-to-right almost in unison. Each update to the DOM from which the document is generated may occur frequently (e.g., multiple times per second), and may include one to several characters, depending on a typing speed of the particular user.

Also, a chat box is provided to a right side of the page, where the users may type comments as they move along, where those comments will not be included on the document itself. For example, as shown here, in a collaborative editing environment, one of the users may request that the other users perform certain actions. As one example, a first user may request that other users review and edit particular paragraphs in the document while the first user reviews and edits other paragraphs.

FIG. 5B shows a screenshot of a spreadsheet document being edited collaboratively by multiple users. In this example, the presence of the particular user's cursors is indicated by colored outlines or boxes on particular cells, and here it appears that four different users are concurrently editing column B. of the spreadsheet.

Figure 6:
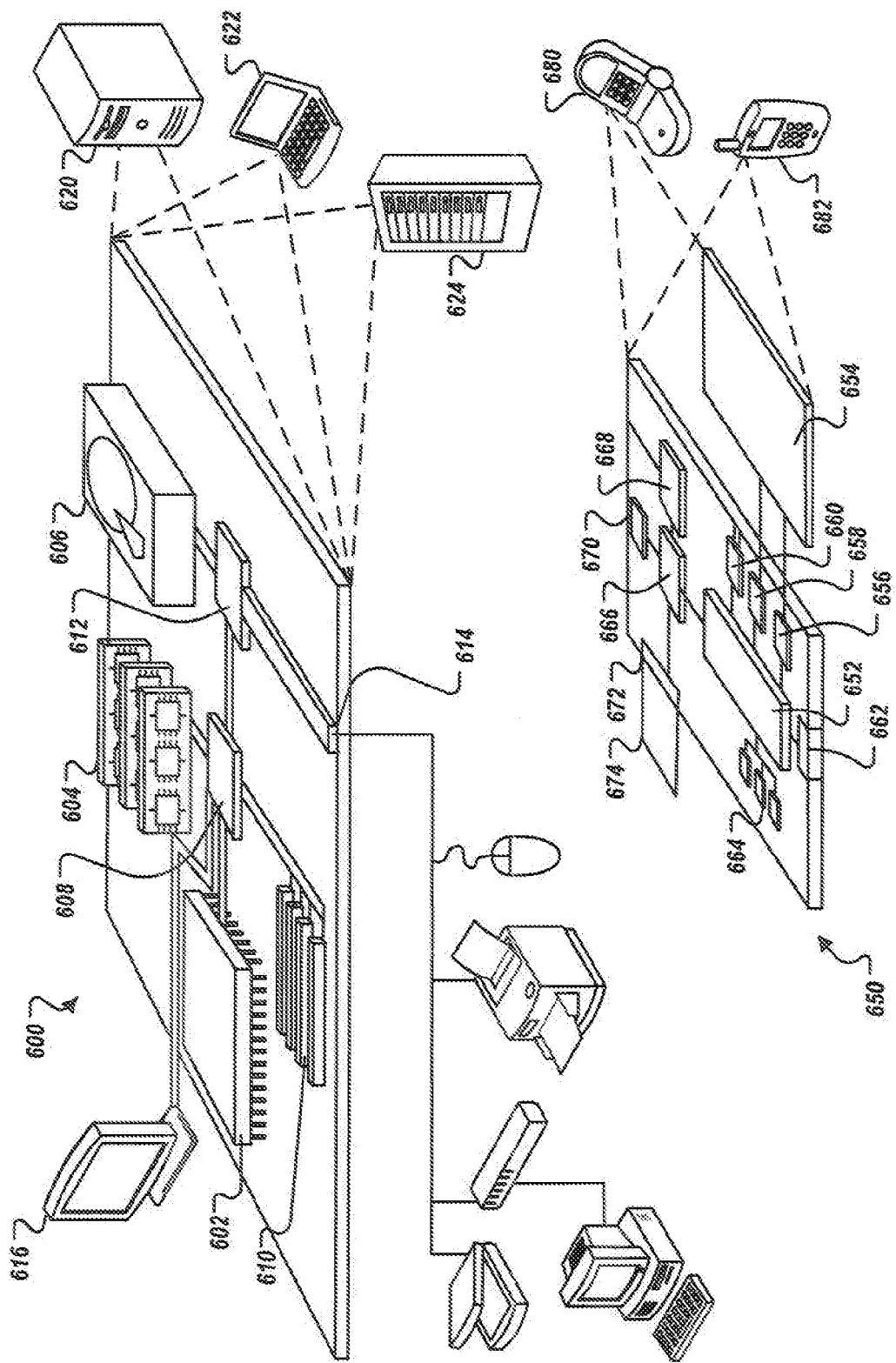
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended, to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600, may be combined with, other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to word processing documents but other forms of documents may also be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented collaborative editing method comprising:
   receiving communications from a plurality of client devices that are accessing a common electronic document to perform collaborative editing during a common session, each communication including information indicating changes made to the electronic document by a respective user and locations at which those changes are to be made in a master copy of a document model and including information indicating a location of a cursor in the electronic document in which the respective user is active;
   updating the master copy of the document model for the electronic document based on the information in the communications indicating changes made to the electronic document;
   transmitting to each particular one of the client devices information indicative of modifications made to the master copy of the document model based on changes to the electronic document made by one or more users of the client devices other than the particular client device, and transmitting to each particular one of the client devices information indicative of the locations in the electronic document of the cursors for the one or more users of the other client devices;
   wherein the electronic document is displayed via a user interface at the particular client device to show, within the electronic document, the cursors for the one or more users of the other client devices, and each of the cursors shows a user identity tag associated with the respective cursor;
   wherein the master copy of the document model is distinct from and not a copy of the common electronic document;
   wherein each client device includes a respective client model and wherein each model includes a one-dimensional character string that includes document characters in an order in which they appear in the electronic document;
   resolving instances where multiple users make conflicting edits to a same portion of the electronic document by using an order in which the conflicting edits are received at a central server to apply a consistent set of rules to the conflicting edits; and
   updating the master copy of the document model for the electronic document based on the resolving.

2. The computer-implemented method of claim 1 wherein transmitting information indicative of modifications made to the master copy of the document model and information indicative of the locations in the electronic document of the cursors includes transmitting information sufficient to allow each of the client devices to display current cursor positions in the electronic document for each of the users.

3. The computer-implemented method of claim 1 wherein each particular communication further includes information identifying the respective user that made the changes to the electronic document indicated in that particular communication, the method further including transmitting information to the client devices indicative of a user name identifying the user associated with particular modifications to the master copy of the document model.

4. The computer-implemented method of claim 1, including repeatedly performing the receiving, updating and transmitting during the common session.

5. The computer-implemented method of claim 1 including:
   resolving instances where multiple users apply conflicting formats to the electronic document; and
   updating the master copy of the document model for the electronic document based on the resolving.

6. A computer-implemented collaborative editing system comprising at least one computing device configured with the following components:
   an interface that receives communications from a plurality of client devices that are accessing a common electronic document to perform collaborative editing during a common session, each communication including information indicating changes made to the electronic document by a respective user and locations at which those changes are to be made to a master copy of a document model and including information indicating a location of a cursor in the electronic document in which the respective user is active;
   a data store that stores the master copy of the document model for the electronic document;
   an active model manager that updates the master copy of the document model for the electronic document based on the information in the communications indicating changes made to the electronic document and the locations at which those changes are to be made in the master copy of the document model;
   collaboration logic that provides to each particular one of the client devices information indicative of modifications made to the master copy of the document model based on changes to the electronic document made by one or more users of the client devices other than the particular client device and information indicative of the locations in the electronic document of the cursors for the one or more users of the other client devices;

wherein the electronic document is displayed via a user interface at the particular client device to show, within the electronic document, the cursors for the one or more users of the other client devices, and each of the cursors shows a user identity tag associated with the respective cursor;

wherein the master copy of the document model is distinct from and not a copy of the common electronic document;

wherein each client device includes a respective client model and wherein each model includes a one-dimensional character string that includes document characters in an order in which they appear in the electronic document;

wherein the collaboration logic resolves instances where multiple users make conflicting edits to a same portion of the electronic document by using an order in which the conflicting edits are received at a central server to apply a consistent set of rules to the conflicting edits; and wherein the active model manager updates the master copy of the document model for the electronic document based on the resolved instances.

7. The computer-implemented system of claim 6 wherein the collaboration logic provides information to the client devices sufficient to allow each of the client devices to display current cursor positions in the electronic document for each of the users.

8. The computer-implemented system of claim 6 wherein each particular communication further includes information identifying the respective user that made the changes to the electronic document indicated in that particular communication, the collaboration logic further providing information to the client devices indicative of a user name identifying the a user associated particular modifications to the master copy of the document model.

9. The computer-implemented system of claim 6 arranged to receive communications from the plurality of client devices, update the master copy of the document model, and provide the information to each particular one of the client devices repeatedly during the common session.

10. The computer-implemented system of claim 6 wherein the collaboration logic is configured to resolve instances where multiple users apply conflicting formats to the electronic document and the active model manager is configured to update the master copy of the document model for the electronic document based on instances resolved by the collaboration logic.

11. One or more tangible computer-readable storage media storing instructions that, when executed by one or more computers, perform operations comprising:

updating a master copy of a document model for an electronic document in response to receiving communications from a plurality of client devices that are accessing a common electronic document to perform collaborative editing during a common session, each communication including information indicating changes made to the electronic document by a respective user and locations at which those changes are to be made in the master copy of the document model and including information indicating a location of a cursor in the electronic in which the respective user is active;

transmitting to each particular one of the client devices information indicative of modifications made to the master copy of the document model based on changes to the electronic document made by one or more users of the client devices other than the particular client device, and transmitting to each particular one of the client devices information indicative of the locations in the electronic document of the cursors for the one or more users of the other client devices;

wherein the electronic document is displayed via a user interface at the particular client device to show, within the electronic document, the cursors for the one or more users of the other client devices, and each of the cursors shows a user identity taq associated with the respective cursor;

wherein the master copy of the document model is distinct from and not a copy of the common electronic document;

wherein each client device includes a respective client model and wherein each model includes a one-dimensional character string that includes document characters in an order in which they appear in the electronic document;

resolving instances where multiple users make conflicting edits to a same portion of the electronic document by using an order in which the conflicting edits are received at a central server to apply a consistent set of rules to the conflicting edits; and updating the master copy of the document model for the electronic document based on the resolving.

12. The tangible computer-readable storage media of claim 11 wherein the operations comprise transmitting information sufficient to allow each of the client devices to display current cursor positions in the electronic document for each of the users.

13. The tangible computer-readable storage media of claim 11 wherein the operations further comprise transmitting information to the client devices indicative of a user name identifying the user associated with particular modifications to the master copy of the document model.

14. The tangible computer-readable storage media of claim 11 including operations to perform the operations of updating and transmitting repeatedly during the common session.

15. The tangible computer-readable storage media of claim 11 wherein the operations further comprise:

resolving instances wherein multiple users apply conflicting formats to the electronic document; and updating the master copy of the document model for the electronic document based on the resolving.

16. A client device comprising memory and a processor, and further comprising:

a web-browser for executing a browser-based document editing application;

a user interface to receive input from a first user of the browser-based editing application, wherein the input is indicative of changes to be made to an electronic document displayed by the application;

a controller to intercept the input received through the interface, determine a location in the document for a cursor based on the input, and pass information to a central server system, wherein the information indicates changes made to the electronic document by the first user and locations at which those changes are to be made in a master copy of a document model stored on the central server system and indicates the location of the cursor in the electronic document in which the first user is active, the controller further being arranged to receive from the central server system data that reflects changes made to the document by one or more users other than the first user and current positions in the electronic document of cursors for the one or more other users, to update a document model stored on the client device executing the browser-based document editing application and render at least a portion of the model to the browser, and to render the current positions of the cursors for the one or more other users to the browser, the controller further being arranged to resolve instances where multiple users make conflicting edits to a same portion of the electronic document by using an order in which the conflicting edits are received by the central server system to apply a consistent set of rules to the conflicting edits, and the controller further being arranged to update the master copy of the document model for the electronic document based on the resolved instances;

wherein the electronic document is displayed via a user interface at the particular client device to show, within the electronic document, the cursors for the one or more users of the other client devices, and each of the cursors shows a user identity taq associated with the respective cursor; and wherein the master copy of the document model is distinct from and not a copy of the common electronic document.

17. The client device of claim 16 further comprising a timer, wherein the controller is arranged to detect when the first user is actively editing the electronic document, to start the timer when the first user begins editing the document, and to pass accrued data from the user's editing activity to the central server system when the timer expires.

18. The client device of claim 17 wherein the timer is set for a period less than 500 milliseconds.

19. The client device of claim 17 wherein the controller is arranged to pass the data describing changes in the document and identifying a current location for a cursor of the first user more than once per second during periods of active editing activity by the first user.

20. The method of claim 1 wherein each respective client model includes a representation of a state of the electronic document.

21. The method of claim 1 wherein at least one of the respective client models includes more than one document model.

22. The method of claim 1 wherein at least one of the respective client models is a subset of the master copy of the document model.

23. The method of claim 1 wherein at least one of the respective client models is stored on the respective client device such that it may be later rendered while the respective client is offline.

24. The method of claim 1, further comprising:
identifying overlapping edits from the received communications;
in response to the overlapping edits, transforming the electronic document at the particular client device in a manner that matches transformations performed on the other client devices and the central server,
wherein the overlapping edits include edits from the particular client device that affect or are affected by edits from the other client devices.

* * * * *

UNITED STATES PATENT AND TRADEMARK OFFICE
CERTIFICATE OF CORRECTION

PATENT NO. : 9,280,529 B2
APPLICATION NO. : 13/350106
DATED : March 8, 2016
INVENTOR(S) : Micah Lemonik et al.

Page 1 of 1

It is certified that error appears in the above-identified patent and that said Letters Patent is hereby corrected as shown below:

In the claims

At column 24, claim number 11, line number 10, please change "taq" to --tag--.

At column 25, claim number 16, line number 21, please change "taq" to --tag--.

Signed and Sealed this
Thirty-first Day of May, 2016

Michelle K. Lee
*Director of the United States Patent and Trademark Office*